US011340953B2

(12) United States Patent
Lei et al.

(10) Patent No.: US 11,340,953 B2
(45) Date of Patent: May 24, 2022

(54) METHOD, ELECTRONIC DEVICE AND COMPUTER PROGRAM PRODUCT FOR LOAD BALANCE

(71) Applicant: EMC IP Holding Company LLC, Hopkinton, MA (US)

(72) Inventors: Alex Lei, Chengdu (CN); Andy Li Ke, Chengdu (CN); Jing Wang, Chengdu (CN); Lawrence Jie Li, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/724,709

(22) Filed: Dec. 23, 2019

(65) Prior Publication Data

US 2021/0019188 A1 Jan. 21, 2021

(30) Foreign Application Priority Data

Jul. 19, 2019 (CN) ......................... 201910655507.3

(51) Int. Cl.

*G06F 15/173* (2006.01)
*G06F 9/50* (2006.01)
*H04L 67/1008* (2022.01)
*H04L 67/1017* (2022.01)
*H04L 67/1031* (2022.01)
*H04L 67/1012* (2022.01)

(52) U.S. Cl.

CPC ............ *G06F 9/505* (2013.01); *G06F 9/5083* (2013.01); *H04L 67/1008* (2013.01); *H04L 67/1012* (2013.01); *H04L 67/1017* (2013.01); *H04L 67/1031* (2013.01)

(58) Field of Classification Search

CPC ... G06F 9/505; G06F 9/5083; H04L 67/1008; H04L 67/1012; H04L 67/1017; H04L 67/1031

USPC .......................................................... 709/224

See application file for complete search history.

(56) References Cited

U.S. PATENT DOCUMENTS

2005/0114281 A1* 5/2005 Riggs ..................... G06Q 10/00 706/46
2006/0209682 A1* 9/2006 Filsfils .................... H04L 45/28 370/219
2007/0180314 A1* 8/2007 Kawashima ........ G06F 11/3433 714/15
2013/0054536 A1* 2/2013 Sengupta ............... G06F 16/21 707/654
2016/0026542 A1* 1/2016 Vasseur .............. G06F 11/1464 714/4.11

(Continued)

*Primary Examiner* — Cheikh T Ndiaye
*Assistant Examiner* — Ayele F Woldemariam
(74) *Attorney, Agent, or Firm* — Womble Bond Dickinson (US) LLP

(57) ABSTRACT

Embodiments of the present disclosure provide a method, an electronic device and a computer program product for load balance. The method comprises: determine, in a round robin period, backup quota ratios for a plurality of servers used for data backup and associated with a cloud service platform; select, based on the backup quota ratios, one server from the plurality of servers; and in response to receiving a request for backup of data from an application on the cloud service platform, cause the backup of the data from the application to the selected server. In this way, load balance for a plurality of backup servers associated with a cloud service platform is achieved.

16 Claims, 4 Drawing Sheets

300

310
DETERMINE, IN A ROUND ROBIN PERIOD, BACKUP QUOTA RATIOS FOR A PLURALITY OF SERVERS USED FOR DATA BACKUP AND ASSOCIATED WITH A CLOUD SERVICE PLATFORM

320
SELECT, BASED ON THE BACKUP QUOTA RATIOS, ONE SERVER FROM THE PLURALITY OF SERVERS

330
IN RESPONSE TO RECEIVING A REQUEST FOR BACKUP OF DATA FROM AN APPLICATION ON THE CLOUD SERVICE PLATFORM, CAUSE THE BACKUP OF THE DATA FROM THE APPLICATION TO THE SELECTED SERVER

(56) References Cited

U.S. PATENT DOCUMENTS

| | | | | |
|---|---|---|---|---|
| 2016/0164787 | A1* | 6/2016 | Roach | H04L 43/065 370/235 |
| 2017/0132089 | A1* | 5/2017 | Roehrsheim | G06F 11/3006 |
| 2017/0270010 | A1* | 9/2017 | Formato | G06F 3/0604 |
| 2018/0232162 | A1* | 8/2018 | Bode | G06F 11/1464 |
| 2018/0307437 | A1* | 10/2018 | Suzuki | G06F 3/067 |

* cited by examiner

METHOD, ELECTRONIC DEVICE AND COMPUTER PROGRAM PRODUCT FOR LOAD BALANCE

CROSS-REFERENCE TO RELATED APPLICATION

This patent application claims priority, under 35 U.S.C. § 119, of Chinese Patent Application No. 201910655507.3, filed Jul. 19, 2019, entitled "METHOD, ELECTRONIC DEVICE AND COMPUTER PROGRAM PRODUCT FOR LOAD BALANCE."

FIELD

Embodiments of the present disclosure generally relate to a load management system, and more particularly, to a method, an electronic device and a computer program product for load balance.

BACKGROUND

Currently, there are various data protection products (such as Avamar vCP) for data backup in a cloud environment for cloud infrastructure tools (such as VMware vCloud Director) to protect data in applications on a cloud service platform. In the current data protection solutions, each data center on an organization on the cloud service platform is bounded to one of its corresponding back-end servers to enable data protection through backup. However, since each data center includes multiple applications and each application includes multiple virtual machines, the amount of data generated by the data center can be very large, resulting in a heavy load for the server for backup, or the amount of data can be small, resulting in a light load for the server. This may lead to an unbalanced load of multiple servers for backup.

SUMMARY

Embodiments of the present disclosure design a solution of load balance.

In accordance with the first aspect, a method of load balance is provided. The method comprises: determining, in a round robin period, backup quota ratios for a plurality of servers used for data backup and associated with a cloud service platform; selecting, based on the backup quota ratios, one server from the plurality of servers; and in response to receiving a request for backup of data from an application on the cloud service platform, causing the backup of the data from the application to the selected server.

In accordance with the second aspect, an electronic device is provided, the electronic device comprises: at least one processor; and a memory coupled to the at least one processor, the memory including instructions stored therein, the instructions, when executed by the at least one processing unit, causing the device perform acts, the acts comprising: determining, in a round robin period, backup quota ratios for a plurality of servers used for data backup and associated with a cloud service platform; selecting, based on the backup quota ratios, one server from the plurality of servers; and in response to receiving a request for backup of data from an application on the cloud service platform, causing the backup of the data from the application to the selected server.

In accordance with the third aspect, a computer program product tangibly stored on a non-transitory computer readable medium is provided, the computer program product comprises machine executable instructions that, when executed, cause the machine to: determine, in a round robin period, backup quota ratios for a plurality of servers used for data backup and associated with a cloud service platform; select, based on the backup quota ratios, one server from the plurality of servers; and in response to receiving a request for backup of data from an application on the cloud service platform, cause the backup of the data from the application to the selected server.

The content described in the Summary is not intended to limit the key or essential features of the embodiments of the present disclosure, and is not intended to limit the scope of the disclosure. Other features of the present disclosure will be readily understood by the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

In the various figures, the same or similar reference numerals indicate the same or similar components.

DETAILED DESCRIPTION OF EMBODIMENTS

Hereinafter, various exemplary embodiments of the present disclosure will be described in detail with reference to the accompanying drawings. It should be noted that the figures and description are merely related to exemplary embodiments. It is to be noted that the alternative embodiments of the structures and methods disclosed herein are readily envisaged according to the following description, and may be used without departing from the principles of the disclosure.

It should be appreciated that description of those embodiments is merely to enable those skilled in the art to better understand and further implement example embodiments disclosed herein and is not intended for limiting the scope disclosed herein in any manner.

Figure 1:
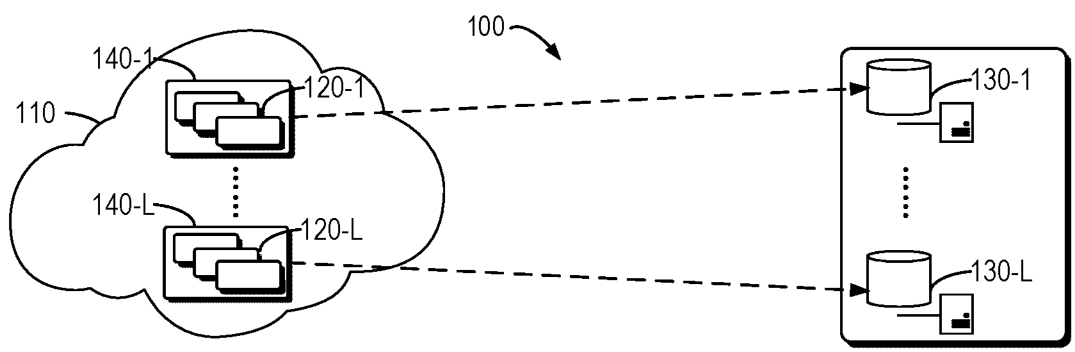
FIG. 1 is a schematic diagram illustrating an example system for selecting a server for a data center.

The backup of data generated on the cloud service platform to multiple servers on the backend is performed to protect the data on the platform. FIG. 1 is a schematic diagram illustrating an example system 100 for selecting a server for a data center. The system 100 includes a cloud service platform 110, a plurality of data centers 140-1 . . . 140-L on the cloud service platform 110, a plurality of application groups 120-1 . . . 120-L on the data center, and a plurality of servers 130-1 . . . 130-L on a backend for backup.

As shown in FIG. 1, in order to perform the backup of data generated on the cloud service platform 110 to a plurality of servers 130-1 . . . 130-L on a backend for backup, a plurality of data centers 140-1 . . . 140-L are associated with a plurality of servers 130-1 . . . 130-L respectively by a backup administrator, with one of the data centers corresponding to one server. However, the server has limited storage space, as the data generated by the data center continue to increase, the server may not be able to store all data from the data center. Furthermore, the load of the server 130-1 . . . 130-L is completely dependent on the amount of data of the data center associated therewith. For example, if the data center 120-1 generates more data, the backup server 130-1 has a heavier load; if the data center 120-L generates less data, the backup server 130-L has a lighter load. This results in an unbalanced load distribution among a plurality of servers 130-1 . . . 130-L. The association process between the data center and the backend server is manually performed by the backup administrator, which also causes waste of human resources.

According to embodiments of the present disclosure, the present disclosure proposes a solution for balance load, in which an associated server for each application rather than for a data center is selected, based on backup quota ratios of a plurality of determined servers on the backend and load balance of a plurality of servers on the backend is achieved through round robin.

Figure 2:
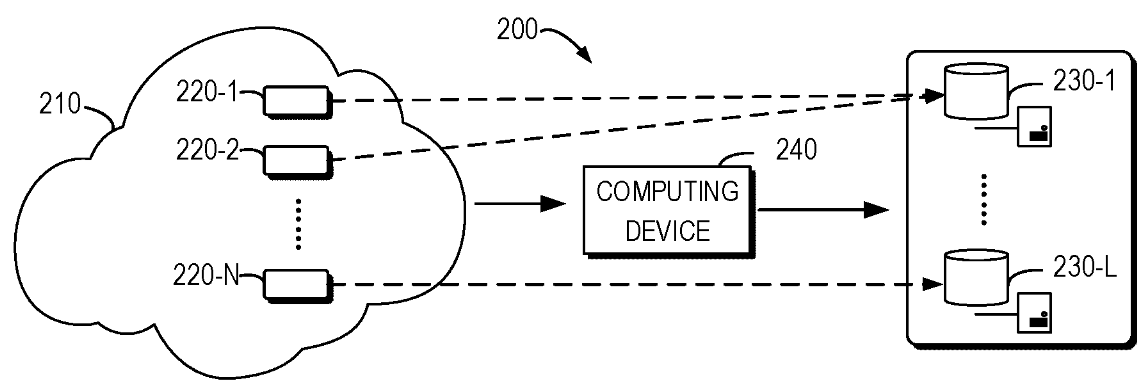
FIG. 2 is a schematic diagram illustrating an example system for selecting a server for an application.

FIG. 2 is a schematic diagram illustrating an example system 200 for selecting a server for an application. The system 200 includes: a cloud service platform 210, an application 220 (220-1 . . . 220-N) on the cloud service platform 210, a server 230 (230-1 . . . 230-L) for backing up data on the backend, and a computing device 240. It should be understood that the computing device 240 is shown in FIG. 2 as a separate block for the convenience of description only but not for limitation. In some embodiments, the computing device 240 can also be integrated into cloud service platform 210 or server 230.

As shown in FIG. 2, the computing device 240 selects, based on the backup quota ratios, an associated server from the servers 230-1 . . . 230-L for each of the applications 220-1 . . . 220-N on the cloud service platform 210, respectively. For example, in the case where the load of the server 230-1 is lighter and the load of the server 230-L is heavier, the computing device 240 can determine the backup quota ratios in one round robin period and allocate more applications to the server 230-1 and fewer applications to the server 230-L based on the ratio. As an example, the computing device 240 may select, according to the backup quota ratios, the server 230-1 as the backup server for the application 220-1, the server 230-1 for the application 220-2, and the server 230-L for the application 220-N, as shown in FIG. 2. Thus, the backup of data generated on the application 220 to the server 230 can be performed to implement load balance of the plurality of servers on the backend while realizing the protection of the data on the platform. The situation where the server is not large enough to store all of the data in the data center can be avoided while the ability of the backend server to processing tasks in parallel is potentially increased. The above process is automatically completed by the computing device 240, effectively saving human resources.

It should be understood that FIGS. 1 and 2 only schematically illustrate devices or components in systems 100 and 200 that are related to embodiments of the present disclosure. Embodiments of the present disclosure are not limited to the specific devices or components depicted in FIGS. 1 and 2, but are generally applicable to any cloud service platform based data backup system.

Figure 3:
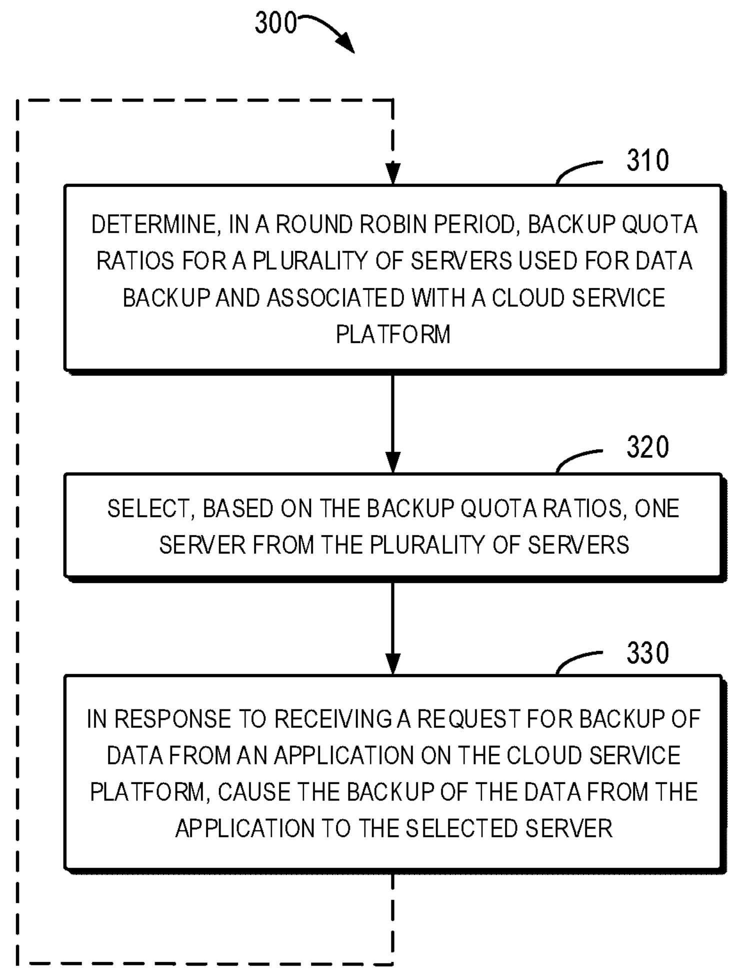
FIG. 3 is a flow chart illustrating a method of load balance in accordance with an embodiment of the present disclosure.

FIG. 3 is a flow chart illustrating a method 300 of load balance in accordance with an embodiment of the present disclosure. The method illustrated in FIG. 3 can be applied to the scenario described in FIG. 2. For convenience of description, reference numerals used in FIG. 3 are consistent with that in FIG. 2 for the same or similar components.

At block 310, the computing device 240 determines, in a round robin period, backup quota ratios for a plurality of servers 230 used for data backup and associated with a cloud service platform 210.

In some embodiments, the cloud service platform 210 includes an application 220 (220-1 . . . 220-N). In order to perform a backup of data generated in the application 220 on the cloud service platform 210 into the server 230, it is required to select a suitable server, for the application 220, from a plurality of servers. In the plurality of servers for backup on the backend, each server performs differently in terms of performance, capacity, load, and so on. In order to enable the server 230 to perform a backup of the data in the application 220 well, it is required to determine a suitable server based on the overall performance of the server.

In some embodiments, there are a plurality of applications 220-1 . . . 220-N on the cloud service platform 210 that need a data backup, that is, it is required to select a corresponding server for each of the plurality of applications 220-1 . . . 220-N. The computing device 240 can determine a suitable server based on the overall performance of a plurality of servers 230-1 . . . 230-L. For example, the server with the largest free capacity can be selected for the application 220. However, since the storage capacity of one server is limited, it is unrealistic to perform a backup of all of the applications to the server 230-1. As the backup of data from the application 220 to the server is performed, its overall performance will also change, and one of the other servers will become a server more suitable for backing up data. In other embodiments, each time a suitable application 230 is selected for an application 220, a suitable server is re-determined based on the overall performance of the server 230. In this way, although a suitable server for backing up data can be obtained in a timely updated manner, each update process consumes a large amount of computing resources, causing unnecessary loss to computing devices and components.

Therefore, based on the above situation, a round robin mechanism is needed when selecting an appropriate server for an application, the round robin mechanism being able to allocate, in turn, a plurality of servers to applications that needs data backup based on the backup quota ratios in one round robin period. Since the overall performance of the plurality of servers 230-1 . . . 230-L is different, the number of times each server is allocated with an application is different. The backup quota ratio indicates the proportional relationship of the number of times the plurality of servers 230-1 . . . 230-L are allocated with applications in one round robin period. For example, in a round robin period, based on the backup quota ratios, the computing device 240 performs one allocation for the server 230-1 each time when it performs two allocations for server 230-1. Thus, whenever an application on the cloud service platform 210 needs an associated server, the computing device 240 selects a suitable server for the application based on the backup quota ratios. The selected server can be a server with better overall performance, or with sub-optimal or worst overall performance. In this way, a server with better overall performance can be allocated with more applications, while a server with poor overall performance can be allocated with fewer applications. The allocation based on quota ratio can realize load balance of a plurality of servers while backing up data, avoiding the situation that some servers are overloaded and some servers are lightly loaded.

In some embodiments, the round robin period may be determined based on different factors, for example, based on a predetermined time period, every three days or every seven days can be considered as one round robin period and the backup quota ratio is updated after the round robin is ended. Or alternatively, for example, based on the number of times that the data backup operation is performed by at least some of the plurality of servers, for example, 2000 times, the time taken to perform the 2000 data backup operations is used as a round robin period. By empirically determining the round robin period, not only the load balance of a plurality of servers in the round robin period is achieved, but also the excessive update of the backup quota ratio, causing unnecessary waste of computing resources and unnecessary loss of system components, is avoided.

In some embodiments, the determination of the round robin period may also be based on the free capacity of at least some of the plurality of servers. When it is detected that the free capacity of the server is lower than the threshold, it means that the server does not have enough free capacity to continue the data backup. At that time, the duration of round robin currently having been performed is determined as the round robin period, and this round robin period is ended, available servers are re-determined and the backup quota ratios for a plurality of servers are recalculated. Or the determination of the round robin period may be based on the increasing rate of storage space occupancy of at least some of the plurality of servers. For example, it is detected that the increasing rate of storage space occupancy of the server is higher than the threshold, that is, the server performs a large amount of data backup in a short time, and the server changes significantly in terms of free space, space occupancy rate, and load. At this time, the duration of round robin can be determined as the round robin period and this round robin period is ended. By determining the round robin period based on the above manner, it is possible to avoid data backup failure due to insufficient free space of the server or late update on quota ratio due to data in a server increasing too fast.

It should be noted that the way to determine the round robin period above is merely an example and is not intended to limit the scope of the present disclosure.

At block 320, the computing device 240 selects, based on the backup quota ratios, one server from the plurality of servers 230-1 . . . 230-L.

In some embodiments, after backup quota ratios is obtained, when selecting a server for an application, based on the backup quota ratios, round robin of servers may be performed according to a certain policy, for example, a high quota ratio corresponds to a priority for allocation. In other embodiments, the round robin may not be performed according to a certain policy, as long as the quota ratio is met, for example, when selecting a server for an application, the counting function of the computing device 240 ensures the proportional relationship among the servers follows the backup quota ratio. That is, it is only required for the computing device 240 to select a server for the application based on the backup quota ratios, without being limited by the related policy of the selected server.

In some embodiments, a corresponding logical unit may be established for each back-end server to implement various logical functions and the logical unit has a one-to-one correspondence with the server. When establishing association between an application and a server, the application can be associated to a logical unit first. Then, a relationship between an application and a server can be established based on the relationship between the logical unit and the server. Associating an application directly to a logical unit rather than a storage entity helps to scale and perform various logical functions.

In some embodiments, after the server 230 is selected for the application 220 based on the backup quota ratios, the computing device 240 may also store an association between the application 220 and the server 230, for example, storing the association in a mapping table. For example, when the application 220-1 needs to backup data, the computing device 240 can directly look up the mapping table stored therein and determines the server 230-1 associated with application 220-1 and then backs up the data to the server.

It can be seen that in the process of selecting the associated server 230 for the application 220, the computing device 240 only needs to follow the determined backup quota ratio without being limited by the order of the selected servers.

At block 330, in response to receiving a request for backup of data from the application 220 on the cloud service platform 210, the computing device 240 causes the backup of the data from the application 220 to the selected server 230.

In some embodiments, when the application 220 on the cloud service platform 210 generates data and the data backup is required, a request for backup of the data is sent to the computing device 240, which, in response to the request, backs up the data to the corresponding database. In some embodiments, upon receiving a request for backup of the data, the computing device 240 looks up a server 230 associated with the application 220 sending the request based on a mapping table storing the association, then the data backup is performed.

In some embodiments, after a round robin period, the backup quota ratios of a plurality of servers may be updated for subsequent data backup for an application. As the applications continue their data backup to the corresponding server, the metadata of the server's attributes, such as the number of customer, space, load, are changing, which means that quota ratio of the server for round robin is also changing. After the round robin period, the server's metadata is re-acquired to update the backup quota ratio of a plurality of servers, for allocating applications to a plurality of servers subsequent. Updating the quota ratio of a server in a timely manner helps to achieve load balance of the server.

In summary, the method 300 enables load balance of the plurality of servers 230 as well as data backup, by determining the backup quota ratio of the server 230 and selecting a suitable server 230 for the application 220 based on the backup quota ratio, thereby solving the problem that some servers are overloaded and some are less loaded. Additionally, the above process is completed by the computing device rather than by a backup administrator, which potentially avoids resources waste.

Figure 4:
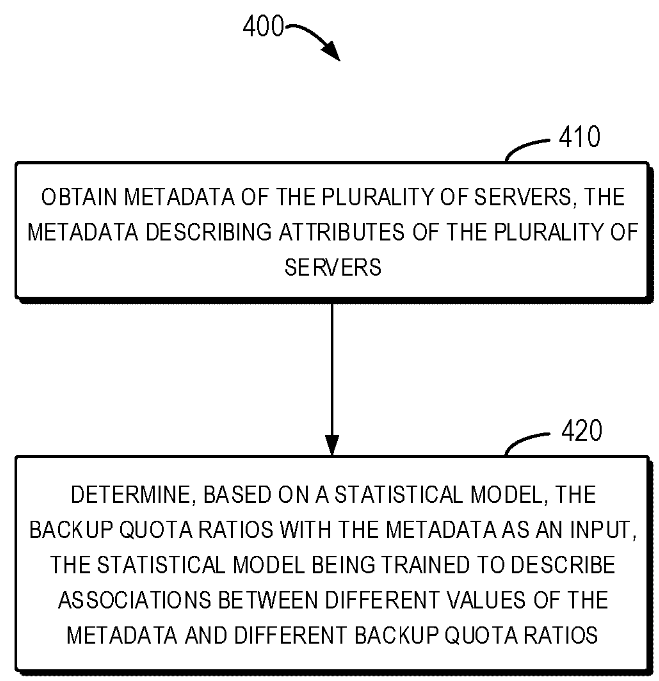
FIG. 4 is a flow chart illustrating a method of determining a backup quota in accordance with an embodiment of the present disclosure.

FIG. 4 is a flow chart illustrating a method 400 of determining a backup quota in accordance with an embodiment of the present disclosure. The process of determining the backup quota ratio is further described below in conjunction with FIG. 4. It should be noted that the specific values in the following examples are merely illustrative and are not intended to limit the scope of the disclosure in any manner.

At block 410, the computing device 240 obtains metadata of a plurality of servers 230, which describe attributes of the plurality of servers 230.

In some embodiments, the attributes of the server include, but are not limited to, the number of available client, free capacity, performance of a server rack, a load index, backup window duration, an increasing rate of storage space occupancy. The above attributes are usually able to characterize the overall performance of the server used for data backup.

In some embodiments, typically the client has a suggested value for the number of clients. The number of available client can be obtained by subtracting the number of registered clients from the suggested value. The more the number of available clients is, the higher priority the server has in terms of allocation.

In some embodiments, a server with more free capacity has a higher priority, and when the free capacity of the server is less than a threshold, no more applications are allocated to the server.

In some embodiments, the total rack size of the server is used as a measure of performance of a server rack. The larger the rack size is, the better the performance of the server rack is and the higher allocation priority it has.

In some embodiments, the load index represents load of the server, for example, the load condition of the server may be described by the total number of tasks that the server has performed in the past period of time; if the newly enabled server runs for less than one week, median or the average or the specified value is taken for calculation; the less the load is the higher priority the server has.

In some embodiments, the server performs maintenance tasks at a scheduled time each day, checking the system to ensure data consistency, in that duration, backup tasks are typically not performed, so servers with longer backup window durations have higher allocation priority.

In some embodiments, the increasing rate of storage occupancy indicates the increasing velocity of the occupied storage space of the server over a period of time. Generally, larger increasing rate of storage occupancy means that a large amount of storage space of the server is used in a short time period. The smaller the increasing rate of the storage occupancy is, the higher allocation priority the server has.

In some embodiments, for example, the following four attributes may be selected to measure the overall performance of a plurality of servers for backup: the number of available clients, free capacity, performance of server rank, and load index. The related metadata of the plurality of servers for describing the above four attributes are respectively obtained, as shown in Table 1.

TABLE 1

| Server | Number of Available Clients | Free capacity(GB) | Performance of Server Rank (TB) | Load Index (Task) |
|---|---|---|---|---|
| A | 3800 | 900 | 1.8 | 3500 |
| B | 5000 | 2800 | 3.9 | 5200 |
| C | 2500 | 2550 | 7.8 | 6000 |
| D | 4700 | 2100 | 7.8 | 4900 |

Taking the server A as an example, the number of available clients of server A is 3800, the free capacity is 900 GB, the performance of the server rank is represented by the total rack size of 1.8 T, and the load index is represented by 3,500 tasks performed in the past period of time. The metadata in Table 1 above is used to describe the overall performance of servers A, B, C, and D.

At block 420, with the metadata as input, the backup quota ratios are determined based on a statistical model that is trained to describe the association between different values of the metadata and different backup quota ratios.

In some embodiments, the statistical model may select any model that can describe the association between different values of the metadata and different backup quota ratios. In this embodiment, a statistical model established based on an analytic hierarchy process is selected as an example. The core concept of analytic hierarchy process is to always compare multiple factors in pairs, which can realize a hierarchical qualitative and quantitative analysis to a decision. It is especially suitable for obtaining quota ratio of different servers between each other in this embodiment. In this example, the statistical model based on the analytic hierarchy method is defined as follows.

First, the mutual importance relationship between pairs of the selected four attributes is determined, where the number 1 indicates equal importance, the number 3 indicates that one of them is slightly more important than the other, and the number 5 indicates that one of them is moderately more important than the other, the number 7 indicates that one of them is extremely more important than the other, and the number 9 indicates that one of them is significantly important compared to the other. The mutual importance relationship between pairs of the four attributes in this example is shown in Table 2.

TABLE 2

| Attribute | Number of available clients | Free capacity | Performance of Server Rack | Load Index |
|---|---|---|---|---|
| Number of registered clients | 1 | 1/9 | 1/5 | 1/7 |
| Free capacity | 9 | 1 | 5 | 3 |
| Performance of Server Rack | 5 | 1/5 | 1 | 1/3 |
| Load Index | 7 | 1/3 | 3 | 1 |

Taking the comparison result between the number of available clients and the free capacity as an example, the importance of the available clients is 1, and the importance of the free capacity is 9, so the value of the second column in the first row of the table is 1/9 and value of the first column in the second row is 9. Taking the performance of the server rack and load index as an example, the importance of the performance of the server rack is 1, and the importance of the load index is 3, so the value of fourth column in the third row is 1/3, and the value of the third column in the fourth row is 3. The standard matrix $A_c$ of the statistical model based on the analytic hierarchy process in this example can be obtained:

$$A_c = \begin{vmatrix} 1 & \frac{1}{9} & \frac{1}{5} & \frac{1}{7} \\ 9 & 1 & 5 & 3 \\ 5 & \frac{1}{5} & 1 & \frac{1}{3} \\ 7 & \frac{1}{3} & 3 & 1 \end{vmatrix} \quad (1)$$

Secondly, the maximum eigenvalue $\lambda_{max}$ is calculated, and any commonly used method for calculating the maximum eigenvalue can be employed. In this embodiment, the summation method is employed, and the formula is as follows:

$$\lambda_{max} = \sum_{i=1}^{n} \frac{(A_c W)_i}{n W_i} \tag{2}$$

Where n represents the feature size and W represents the feature vector. In some embodiments, the feature vector W can be calculated by normalizing the elements of $A_c$ by columns, adding the elements of $A_c$ by rows, normalizing the added row vectors to finally obtain W. Further, the maximum eigenvalue $\lambda_{max}$ can be calculated. In this example described in connection with Table 2, $\lambda_{max}=4.17$.

According to the maximum eigenvalue and the dimension coefficient index RI, the standard weight $W_{max}$ of the statistical model can be obtained, wherein the dimension coefficient index RI is a given value in the analytic hierarchy process, as shown in Table 3.

TABLE 3

| Matrix Dimension | 1 | 2 | 3 | 4 | 5 | 6 | 7 | 8 | 9 |
|---|---|---|---|---|---|---|---|---|---|
| RI | 0 | 0 | 0.58 | 0.90 | 1.12 | 1.24 | 1.32 | 1.41 | 1.45 |

In this embodiment, the matrix dimension is 4, and the corresponding RI value is 0.9; then the standard weight $W_{max}$ can be obtained based on the maximum eigenvalue $W_{max}$ and the RI value:

$$W_{max} = \begin{vmatrix} 0.04 \\ 0.56 \\ 0.13 \\ 0.27 \end{vmatrix} \tag{3}$$

That is, in the calculation model based on the analytic hierarchy process in the present embodiment, the standard weight values of the four attributes are: number of registered client: 0.04, free capacity: 0.56, performance of rack: 0.13, and load index: 0.27.

Additionally or alternatively, the reliability of the statistical model can also be verified by calculating a one-time ratio. Specifically, the one-time index CI is first calculated as follows:

$$CI - \frac{\lambda_{max} - n}{n - 1} \tag{4}$$

The one-off ratio is determined according to the ratio of CI and the dimension coefficient index RI of the analytic hierarchy process:

$$CR = \frac{CI}{RI} \tag{5}$$

A value of CR less than 0.1 indicates that the model is reliable, otherwise, the model is not reliable. In this embodiment, CR=0.0647, and the calculation model is reliable.

The above process completed the training of the statistical model based on the analytic hierarchy process, and the weight allocation result of the four attributes of the model is obtained.

The metadata in Table 1 is used as input to the statistical model to calculate the backup quota ratios.

TABLE 4a

| Importance | Hierarchy setting |
|---|---|
| 1 | Relative number of available clients < 1000 |
| 3 | 100 ≤ Relative number of available clients < 1000 |
| 5 | 1000 ≤ Relative number of available clients < 2000 |
| 7 | 2000 ≤ Relative number of available clients ≤ 3000 |
| 9 | Relative number of available clients > 3000 |

The hierarchy setting of the attribute of the number of available clients in terms of importance is shown in Table 4a. For the attribute of the number of available clients, the number of available clients of the server is firstly determined based on the suggested value of the number of server clients and the number of registered client; then the hierarchy relationship of importance of every two servers in terms of each of the four attributes is determined. For example, if the number of available clients of a server A is 1200 more than that of a server B, the importance value of A relative to B in terms of the number of available clients is 1/5, and the importance value of B relative to A is 5, as shown in Table 4b.

TABLE 4b

| Number of Available Clients | A | B | C | D | $W_1$ |
|---|---|---|---|---|---|
| A | 1 | 1/5 | 5 | 1/3 | 0.14 |
| B | 5 | 1 | 7 | 3 | 0.54 |
| C | 1/5 | 1/7 | 1 | 1/7 | 0.05 |
| D | 3 | 1/3 | 7 | 1 | 0.27 |

where $W_1$ is the calculated weight allocation of the four servers in terms of the attribute of the number of available clients.

Similarly, the weight allocation of the four servers in terms of the other three attributes is calculated.

Table 5a shows the hierarchy settings of the four servers in terms of free capacity, and Table 5b is the table of importance in terms of free capacity, with $W_2$ being the corresponding weight allocation.

TABLE 5a

| Importance | Hierarchy setting |
|---|---|
| 1 | Relative free capacity < 300 GB |
| 3 | 300 GB ≤ Relative free capacity < 800 GB |
| 5 | 800 GB ≤ Relative free capacity < 1800 GB |
| 7 | 1800 GB ≤ Relative free capacity ≤ 3900 GB |
| 9 | Relative free capacity > 3900 GB |

TABLE 5b

| Free capacity | A | B | C | D | $W_2$ |
|---|---|---|---|---|---|
| A | 1 | 1/7 | 1/5 | 1/5 | 0.05 |
| B | 7 | 1 | 1 | 3 | 0.40 |
| C | 5 | 1 | 1 | 3 | 0.37 |
| D | 5 | 1/3 | 3 | 1 | 0.17 |

Table 6a shows the hierarchy settings of the four servers in terms of performance of a server rack, and Table 6b is the table of importance in terms of performance of a server rack, with $W_3$ being the corresponding weight allocation.

TABLE 6a

| Importance | Hierarchy setting |
|---|---|
| 1 | Relative total capacity < 1 T |
| 3 | 1 T < Relative total capacity ≤ 2 T |
| 5 | 2 T < Relative total capacity ≤ 4 T |
| 7 | Relative total capacity > 4 T |
| 9 | |

TABLE 6b

| Performance of Server Rack | A | B | C | D | $W_3$ |
|---|---|---|---|---|---|
| A | 1 | 1/5 | 1/7 | 1/7 | 0.05 |
| B | 5 | 1 | 1/5 | 1/5 | 0.13 |
| C | 7 | 5 | 1 | 1 | 0.41 |
| D | 7 | 5 | 1 | 1 | 0.41 |

Table 7a shows the hierarchy settings of the four servers in terms of load index, and Table 7b is the table of importance in terms of the load index, with W4 being the corresponding weight allocation.

TABLE 7a

| Importance | Hierarchy setting |
|---|---|
| 1 | Relative number of tasks executed < 1000 |
| 3 | 1000 ≤ Relative number of tasks executed < 2000 |
| 5 | 2000 ≤ Relative number of tasks executed < 4000 |
| 7 | 4000 ≤ Relative number of tasks executed ≤ 8000 |
| 9 | Relative number of tasks executed > 8000 |

TABLE 7b

| Load Index | A | B | C | D | $W_4$ |
|---|---|---|---|---|---|
| A | 1 | 3 | 5 | 3 | 0.52 |
| B | 1/3 | 1 | 1 | 1 | 0.16 |
| C | 1/5 | 1 | 1 | 1/3 | 0.11 |
| D | 1/3 | 1 | 3 | 1 | 0.21 |

The weight values of the four servers in terms of the four attributes, namely, the number of registered clients, free capacity, performance of the server rack, and load index, are obtained therefrom, resulting in a weight matrix $W_{total}$.

$$W_{total}=|W_1W_2W_3W_4| \quad (6)$$

The final statistical results are further obtained based on the weight values of the four attributes, with the number of registered clients being 0.04, free capacity being 0.56, performance of the server rack being 0.13, and load index being 0.27. The calculation process is as shown in Table 8.

TABLE 8

| Server | Number of available clients | Free capacity | Performance of server rack | Load index | Weight |
|---|---|---|---|---|---|
| A | 0.14 × 0.04 | 0.05 × 0.56 | 0.05 × 0.13 | 0.52 × 0.27 | 0.18 |
| B | 0.54 × 0.04 | 0.40 × 0.56 | 0.13 × 0.13 | 0.16 × 0.27 | 0.30 |
| C | 0.05 × 0.04 | 0.37 × 0.56 | 0.41 × 0.13 | 0.11 × 0.27 | 0.29 |
| D | 0.27 × 0.04 | 0.17 × 0.56 | 0.41 × 0.13 | 0.21 × 0.27 | 0.21 |

Backup quota ratios in a round robin period are determined based on statistical results from statistical models. Continuing with the above embodiment as an example, the calculated weight values of the four servers are as follows: A: 0.18, B: 0.30, C: 0.29, and D: 0.21. The above results can be rounded up and simplified, resulting in the backup quota ratios of the four servers as 18:30:29:21. In the process of determining the server for the application, the above proportional relationship needs to be followed, that is, when 18 applications are allocated for the server A, 30 applications are allocated for the server B, 29 applications are allocated for the server C, and 21 applications are allocated for the server D. The method of determining the backup quota ratio based on the weight values of the servers described above is only exemplary, other conventional methods can also be used. For example, the above weights can be rounded up and rounded off, resulting in backup quota ratios of 2:3:3:2.

Figure 5:
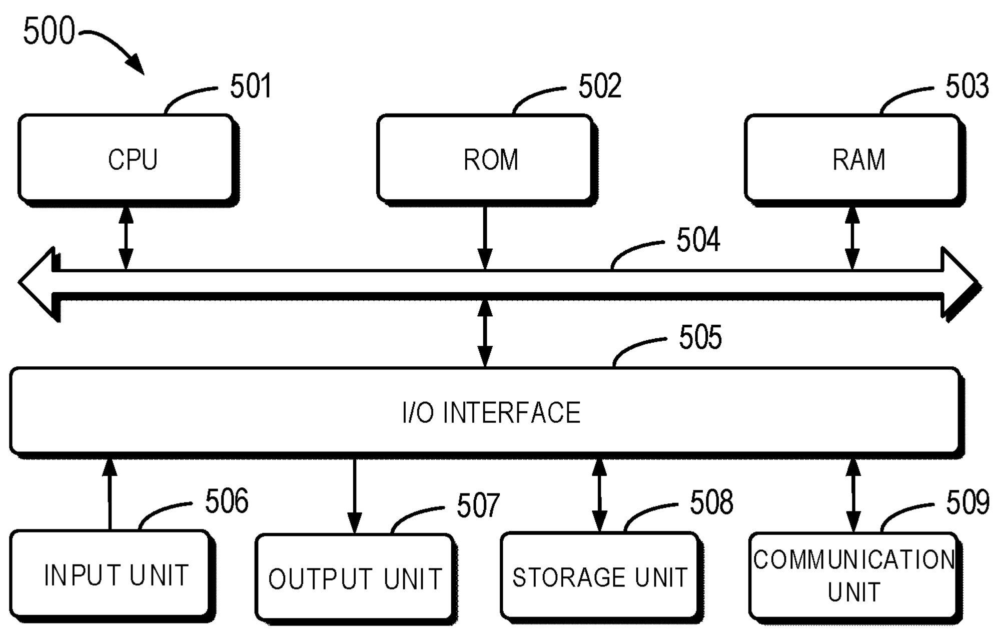
FIG. 5 is a schematic block diagram illustrating an electronic device that can be used to implement embodiments of the present disclosure.

FIG. 5 is a block diagram illustrating a device 500 than can be used to implement embodiments of the present disclosure. As shown in FIG. 5, the device 500 comprises a central processing unit (CPU) 501 that may perform various appropriate acts and processing based on computer program instructions stored in a read-only memory (ROM) 502 or computer program instructions loaded from a storage section 508 to a random access memory (RAM) 503. In the RAM 503, there further store various programs and data needed for operations of the device 500. The CPU 501, ROM 502 and RAM 503 are connected to each other via a bus 504. An input/output (I/O) interface 505 is also connected to the bus 504.

The following components in the device 500 are connected to the I/O interface 505: an input 506 such as a keyboard, a mouse and the like; an output unit 507 including various kinds of displays and a loudspeaker, etc.; a memory unit 508 including a magnetic disk, an optical disk, and etc.; a communication unit 509 including a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the methods 300 and 400, may be executed by the processing unit 501. For example, in some embodiments, the methods 300 and 400 may be implemented as a computer software program that is tangibly embodied on a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the methods 300 and 400 as described above may be executed.

The present disclosure may be a method, a device, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for load balance, comprising:

determining, in a round robin period, backup quota ratios for a plurality of servers used for data backup and associated with a cloud service platform, wherein determining backup quota ratios comprises:

calculating a weight value of each server based on a number of registered clients, free capacity, performance of a server rack, and a load index, and rounding up and simplifying the weight value, wherein for each server, each backup quota ratio indicates a proportional relationship of a number of times each of the plurality of servers is allocated to an application on the cloud service platform in the round robin period;

selecting, based on the backup quota ratios, a server from the plurality of servers;

in response to receiving a request for backup of data from an application on the cloud service platform, causing the backup of the data from the application to the selected server;

updating, after the round robin period ends, the backup quota ratios for the plurality of servers, for subsequent backup of application data; and storing, in a mapping table, an association between the application and the selected server for the backup.

2. The method of claim 1, wherein determining the backup quota ratios for the plurality of servers in the round robin period comprises:

obtaining metadata of the plurality of servers, the metadata describing attributes of the plurality of servers; and determining, based on a statistical model, the backup quota ratios with the metadata as an input, the statistical model being trained to describe associations between different values of the metadata and different backup quota ratios.

3. The method of claim 2, wherein the attributes comprise at least one of:

the number of registered clients, free capacity, performance of a server rack, a load index, backup window duration and an increasing rate of a storage space occupancy.

4. The method of claim 2, wherein the statistical model is generated based on an analytic hierarchy process, and wherein the analytic hierarchy process generates a dimension coefficient index RI.

5. The method of claim 4, wherein a standard weight of the statistical model is based on the dimension coefficient index RI and a maximum eigenvalue, the dimension coefficient index RI being determined based on a matrix dimension of a standard matrix of the statistical model.

6. The method of claim 1, wherein the round robin period is determined based on one of:

a predetermined time period;

the number of data backup operations performed by at least some of the plurality of servers, free capacity of at least some of the plurality of servers; and increasing rates of storage space occupancies of at least some of the plurality of servers.

7. The method of claim 1, wherein the performance of the server rack is based on a total rack size of each server.

8. The method of claim 1, wherein the load index represents a load of each server and is based on a total number of tasks that each server has performed in a past period of time.

9. An electronic device, comprising:

at least one processor; and a memory coupled to the at least one processor, the memory including instructions stored therein, the instructions, when executed by the at least one processor, causing the device to perform acts, the acts comprising:

determining, in a round robin period, backup quota ratios for a plurality of servers used for data backup and associated with a cloud service platform, wherein determining backup quota ratios comprises:

calculating a weight value of each server based on a number of registered clients, free capacity, performance of a server rack, and a load index, and rounding up and simplifying the weight value, wherein for each server, each backup quota ratio indicates a proportional relationship of a number of times each of the plurality of servers is allocated to an application on the cloud service platform in the round robin period;

selecting, based on the backup quota ratios, a server from the plurality of servers;

in response to receiving a request for backup of data from an application on the cloud service platform, causing the backup of the data from the application to the selected server;

updating, after the round robin period ends, the backup quota ratios for the plurality of servers, for subsequent backup of application data; and storing, in a mapping table, an association between the application and the selected server for the backup.

10. The device of claim 9, wherein determining the backup quota ratios for the plurality of servers in the round robin period comprises:

obtaining metadata of the plurality of servers, the metadata describing attributes of the plurality of servers; and determining, based on a statistical model, the backup quota ratios with the metadata as an input, the statistical model being trained to describe an association between different values of the metadata and different backup quota ratios.

11. The device of claim 10, wherein the attributes comprise at least one of:

the number of registered clients, free capacity, performance of a server rack, a load index, backup window duration and an increasing rate of a storage space occupancy.

12. The device of claim 9, wherein the round robin period is determined based on one of the following factors:

a predetermined time period;

the number of data backup operations performed by at least some of the plurality of servers;

free capacity of at least some of the plurality of servers; and increasing rates of storage space occupancies of at least some of the plurality of servers.

13. A computer program product tangibly stored on a non-transitory computer readable medium and comprising machine executable instructions that, when executed, cause a device to:

determine, in a round robin period, backup quota ratios for a plurality of servers used for data backup and associated with a cloud service platform, wherein to determine the backup quota ratios comprises:

calculating a weight value of each server based on a number of registered clients, free capacity, performance of a server rack, and a load index, and rounding up and simplifying the weight value, wherein for each server, each backup quota ratio indicates a proportional relationship of a number of times each of the plurality of servers is allocated to an application on the cloud service platform in the round robin period;

select, based on the backup quota ratios, a server from the plurality of servers;

in response to receiving a request for backup of data from an application on the cloud service platform, cause the backup of the data from the application to the selected server;

update, after the round robin period ends, the backup quota ratios for the plurality of servers, for subsequent backup of application data; and store, in a mapping table, an association between the application and the selected server for the backup.

14. The computer program product of claim 13, wherein the machine executable instructions, when executed, cause the device to:

obtain metadata of the plurality of servers, the metadata describing attributes of the plurality of servers; and determine, based on a statistical model, the backup quota ratios with the metadata as an input, the statistical model being trained to describe associations between different values of the metadata and different backup quota ratios.

15. The computer program product of claim 14, wherein the attributes comprise at least one of: the number of registered clients, free capacity, performance of a server rack, a load index, backup window duration and an increasing rate of a storage space occupancy.

16. The computer program product of claim 13, wherein the round robin period is determined based on one of:

a predetermined time period;

the number of data backup operations performed by at least some of the plurality of servers;

free capacity of at least some of the plurality of servers; and increasing rates of storage space occupancies of at least some of the plurality of servers.

* * * * *